United States Patent [19]

Sawdon

[11] Patent Number: 6,115,898
[45] Date of Patent: *Sep. 12, 2000

[54] FORCE MULTIPLYING APPARATUS FOR CLAMPING A WORKPIECE AND FORMING A JOINT THEREIN

[75] Inventor: Edwin G. Sawdon, St. Clair, Mich.

[73] Assignee: BTM Corporation, Marysville, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/469,217

[22] Filed: Jun. 6, 1995

[51] Int. Cl.⁷ .............................. B23P 11/00; B23P 19/04
[52] U.S. Cl. .............................. 29/243.5; 29/252; 29/283; 29/283.5; 269/32; 269/233; 269/239; 81/128
[58] Field of Search ............................ 29/700, 788, 796, 29/816, 818, 252, 267, 283, 283.5, 243.5, 270, 276; 269/32, 233, 239; 83/646; 81/128, 417, 57.19, 57.44; 74/104

[56] References Cited

U.S. PATENT DOCUMENTS

| | | | |
|---|---|---|---|
| D. 334,701 | 4/1993 | Blatt et al. . | |
| 667,350 | 2/1901 | Ulrich et al. | 74/104 |
| 1,176,793 | 3/1916 | Tuttle | 29/21.1 |
| 1,667,616 | 4/1928 | Wright et al. . | |
| 1,736,171 | 11/1929 | Powell . | |
| 2,165,322 | 7/1939 | Weston . | |
| 2,381,999 | 8/1945 | Bonnafe . | |
| 2,845,847 | 8/1958 | Blatt et al. . | |
| 3,027,155 | 3/1962 | Paterson . | |
| 3,058,214 | 10/1962 | Mekler . | |
| 3,273,878 | 9/1966 | Blatt . | |
| 3,365,253 | 1/1968 | Haller . | |
| 3,371,923 | 3/1968 | Blatt . | |
| 3,381,954 | 5/1968 | Blatt . | |
| 3,469,892 | 9/1969 | Langstroth . | |
| 3,482,830 | 12/1969 | Sendaykas | 269/233 |
| 3,545,050 | 12/1970 | Blatt et al. . | |
| 3,565,415 | 2/1971 | Blatt . | |
| 3,570,835 | 3/1971 | McPherson . | |

(List continued on next page.)

FOREIGN PATENT DOCUMENTS

| | | |
|---|---|---|
| 0 163 219 A1 | 12/1985 | European Pat. Off. . |
| 0 317 924 A2 | 11/1988 | European Pat. Off. . |
| 0 341 155 A1 | 5/1989 | European Pat. Off. . |
| 0 435 079 A2 | 7/1991 | European Pat. Off. . |
| 0 508 881 A2 | 4/1992 | European Pat. Off. . |
| 377960 | 9/1907 | France .................................. 81/128 |
| 2223177 | 10/1974 | France . |
| 2 340 798 | 8/1980 | France . |
| 2 484 310 | 12/1981 | France . |
| 255976 | 1/1913 | Germany .............................. 81/417 |
| 2 019 011 | 7/1971 | Germany . |
| 25 55 207 A1 | 7/1986 | Germany . |
| 36 13 852 C1 | 10/1987 | Germany . |
| 932218 | 7/1963 | United Kingdom . |
| 1036830 | 7/1966 | United Kingdom . |
| 2 082 945 | 3/1982 | United Kingdom . |
| 2 191 428 | 12/1987 | United Kingdom . |

OTHER PUBLICATIONS

English translation of French Patent Publication No. 2,223, 177.

PHD Solutions for Factory Automation Grippers, pp. 6–1 to 6–77, 1993.

PHD Series GRC Parallel Grippers, pp. 1–20, 1996.

PHD Series GRD Parallel Grippers, pp. 1–16, 1996.

PHD Series 190 & 191 Parallel Grippers, pp. 1–16, 1995.

1500 Series Omni–Head Power Clamps, BTM Corporation, pp. 1–7 (prior to Jan. 1997).

(List continued on next page.)

*Primary Examiner*—David P. Bryant
*Attorney, Agent, or Firm*—Harness, Dickey & Pierce, P.L.C.

[57] ABSTRACT

A force multiplying apparatus employs a pivoting clamping arm motion and then a subsequent linear clamping arm motion. A slotted swing arm and a slotted drive link are pivotably and slidably mounted to a relatively fixed body. A toggling action and coincidental sliding of pivots cause the multiplied closing forces.

13 Claims, 7 Drawing Sheets

U.S. PATENT DOCUMENTS

| | | |
|---|---|---|
| 3,599,957 | 8/1971 | Blatt . |
| 3,618,931 | 11/1971 | Blatt . |
| 3,702,185 | 11/1972 | Blatt . |
| 3,724,837 | 4/1973 | McPherson . |
| 3,768,401 | 10/1973 | Sahm et al. . |
| 4,019,784 | 4/1977 | Ladin et al. . |
| 4,021,027 | 5/1977 | Blatt . |
| 4,234,057 | 11/1980 | Nakane et al. . |
| 4,240,620 | 12/1980 | Tunkers . |
| 4,365,792 | 12/1982 | Johns . |
| 4,396,183 | 8/1983 | Lymburner . |
| 4,445,676 | 5/1984 | Tunkers . |
| 4,451,026 | 5/1984 | Coope . |
| 4,458,889 | 7/1984 | McPherson et al. . |
| 4,494,739 | 1/1985 | Valentine . |
| 4,496,138 | 1/1985 | Blatt . |
| 4,518,187 | 5/1985 | Blatt et al. . |
| 4,570,914 | 2/1986 | Blatt . |
| 4,591,138 | 5/1986 | Baills et al. . |
| 4,596,415 | 6/1986 | Blatt . |
| 4,616,536 | 10/1986 | Knebel et al. ............................ 81/128 |
| 4,618,131 | 10/1986 | Campisi et al. . |
| 4,620,696 | 11/1986 | Blatt . |
| 4,637,597 | 1/1987 | McPherson et al. . |
| 4,647,097 | 3/1987 | Lessway . |
| 4,647,100 | 3/1987 | Lessway . |
| 4,673,173 | 6/1987 | Shochi et al. . |
| 4,696,503 | 9/1987 | Collodel . |
| 4,707,013 | 11/1987 | Vranish et al. . |
| 4,723,767 | 2/1988 | McPherson et al. . |
| 4,723,806 | 2/1988 | Yuda . |
| 4,768,821 | 9/1988 | Hucul et al. . |
| 4,777,445 | 10/1988 | Kahl . |
| 4,793,602 | 12/1988 | McPherson . |
| 4,834,663 | 5/1989 | Kahl . |
| 4,836,091 | 6/1989 | Taylor . |
| 4,838,532 | 6/1989 | Horn et al. . |
| 4,848,338 | 7/1989 | De Satnick et al. . |
| 4,854,564 | 8/1989 | McPherson et al. . |
| 4,859,138 | 8/1989 | Brocklebank et al. . |
| 4,863,150 | 9/1989 | Hodl et al. . |
| 4,892,344 | 1/1990 | Takada et al. . |
| 4,921,233 | 5/1990 | Fabrice . |
| 5,040,278 | 8/1991 | Eckold et al. ............................ 29/252 |
| 5,064,177 | 11/1991 | Witt et al. . |
| 5,072,652 | 12/1991 | Blatt . |
| 5,118,088 | 6/1992 | Sawdon . |
| 5,125,632 | 6/1992 | Blatt et al. . |
| 5,152,566 | 10/1992 | Blatt et al. . |
| 5,152,568 | 10/1992 | Blatt . |
| 5,163,729 | 11/1992 | Borcea et al. . |
| 5,165,670 | 11/1992 | Sawdon . |
| 5,171,001 | 12/1992 | Sawdon . |
| 5,174,709 | 12/1992 | Blatt et al. . |
| 5,193,789 | 3/1993 | Tucker . |
| 5,215,295 | 6/1993 | Hoover . |
| 5,222,854 | 6/1993 | Blatt et al. . |
| 5,277,411 | 1/1994 | Justus . |
| 5,299,847 | 4/1994 | Blatt et al. . |
| 5,452,981 | 9/1995 | Crorey et al. . |
| 5,490,663 | 2/1996 | Stojkovic et al. . |
| 5,503,378 | 4/1996 | Schauss et al. ............................ 269/32 |
| 5,516,173 | 5/1996 | Sawdon . |
| B1 4,905,973 | 7/1994 | Blatt . |

OTHER PUBLICATIONS

Power Clamps & Grippers, BTM Corporation, pp. 1–23 (prior to Jan. 1997).

Grippers for High Speed Part Transfer in Press, BTM Corporation, pp. 1–15 (prior to Jan. 1997).

Sealed Power Clamps, BTM Corporation, pp. 1–10 (prior to Jan. 1997).

Sealed Toggle Clamps, BTM Corporation, 4 pages (prior to Jan. 1997).

1500 Series Power Grippers and Accessories, BTM Corporation, 4 pages (prior to Jan. 1997).

Power Clamp 1500 Series, BTM Corporation, 10 pages (prior to Jan. 1997).

Optional AC & DC Electrical Proximity Switches for BTM Power Clamps, BTM Corporation, 2 pages (prior to Jan. 1997).

BTM Omni–Head Mini–Power Clamps, New Concept in Industrial Power Clamps Simplifies Off–Center Mounting, BTM Corporation, 3 pages (prior to Mar. 31, 1997).

BTM Omni–Head 100 Series Mini–Power Clamps, How to Order BTM Power Clamps, BTM Corporation, 1 pages, (prior to Mar. 31, 1997).

Thin Power Clamps 2500–2000–390 Series, 1500–1000–140 Series, BTM Corporation 5 pages, (prior to Mar. 31, 1997).

BTM 1500–1000–140 Series, BTM Corporation, 2 pages, (prior to Mar. 31, 1997).

1500 & 2500 Series Sealed Toggle Clamps, BTM Corporation, 3 pages (prior to Mar. 31, 1997).

1500 & 2500 Series Sealed Offset Toggle Clamps, BTM Corporation, 3 pages (prior to Mar. 31, 1997).

BTM Drawing entitled "BTM PG 1500 P2F Assembly" and BTM Drawing entitled "BTM PG 1500 P3F Assembly" (prior to Mar. 31, 1997).

PG–38 & PG–45 Locking Grippers, BTM Corporation, 8 pages, (prior to Jan. 1997).

FIG. 13.

FORCE MULTIPLYING APPARATUS FOR CLAMPING A WORKPIECE AND FORMING A JOINT THEREIN

BACKGROUND AND SUMMARY OF THE INVENTION

This invention relates generally to clamps and specifically to a powered, force multiplying apparatus.

In the clamping and sheet metal joining industries, it is commonly known to provide a clamping mechanism for temporarily or permanently securing sheets of material. Typically, these traditional clamps are limited to a pivoting movement, a linear movement, or a linear then pivoting movement, when a clamping arm is moved between an open/retracted position to a closed/material engaging position.

Examples of traditional clamping arm movement in the rotational manner is disclosed within the following U.S. patents: U.S. Pat. No. 5,171,001 entitled "Sealed Power Clamp"; U.S. Pat. No. 5,165,670 entitled "Retracting Power Clamp"; and U.S. Pat. No. 5,118,088 entitled "Power Clamp"; all of which were invented by the inventor of the present invention. A variety of linear motion clamping arms are disclosed within the following U.S. patents: U.S. Pat. No. 4,574,473 entitled "Self-Attaching Fastener and Apparatus for Securing Same to Sheet Material"; and U.S. Pat. No. 3,730,044 entitled "Fluid Operated Apparatus"; both of which were invented by the inventor of the present invention and are incorporated by reference herewithin. Other clamping devices have been employed such as those disclosed within the following U.S. patents: U.S. Pat. No. 5,193,789 entitled "Automatic Clamping Apparatus" which issued to Tucker; U.S. Pat. No. 4,723,767 entitled "Rotary Powered Linear Actuated Clamp" which issued to McPherson et al.; U.S. Pat. No. 3,599,957 entitled "Cam Wedge Power Swing Away With Guided Arm" which issued to Blaft; and U.S. Pat. No. 3,482,830 entitled "Clamp" which issued to Sendoykas; all of which are incorporated by reference herewithin. While many of these constructions have proven satisfactory, it would be desirable to achieve greater clamping force with less driving force.

In accordance with the present invention, the preferred embodiment of a force multiplying apparatus employs a pivoting clamping arm motion and then a subsequent linear clamping arm motion. In another aspect of the present invention, a slotted swing arm and a slotted drive link are pivotably and slidably mounted to a relatively fixed body. In yet another aspect of the present invention, a punch is mounted upon a distal section of the clamping arm for acting in conjunction with a die thereby clinching or otherwise joining sheets of material disposed therebetween.

The apparatus of the present invention is advantageous over traditional constructions since the present invention provides the ability to significantly multiply or increase the clamping forces without requiring a corresponding increase in the actuator or driving forces. The present invention force multiplying apparatus additionally achieves a more accurate and secure joint between material sheets due to the final linear motion of the clamping arm. As another advantage, the present invention is extremely durable and reliable by employing more robust and less delicate component parts as compared to many conventional constructions. Additional advantages and features of the present invention will become apparent from the following description and appended claims, taken in conjunction with the accompanying drawings.

BRIEF DESCRIPTION OF THE DRAWINGS

FIG. 2 is a bottom elevational view showing the preferred embodiment apparatus of the present invention, disposed in the fully closed position;

FIG. 3 is a side elevational view showing a swing arm employed in the preferred embodiment apparatus of the present invention;

FIG. 4 is a side elevational view showing a cam drive link employed in the preferred embodiment apparatus of the present invention;

FIG. 6 is a side elevational view showing a cam slide block employed in the preferred embodiment apparatus of the present invention;

FIG. 7 is a side elevational view showing a rod eye employed in the preferred embodiment apparatus of the present invention;

3

FIG. 8 is a side elevational view showing a sealed roller bearing employed in the preferred embodiment apparatus of the present invention;

FIGS. 9–12 are a series of side elevational views showing the preferred embodiment apparatus of the present invention in differing operational positions.

DETAILED DESCRIPTION OF THE PREFERRED EMBODIMENT

Figures 1, 1A:
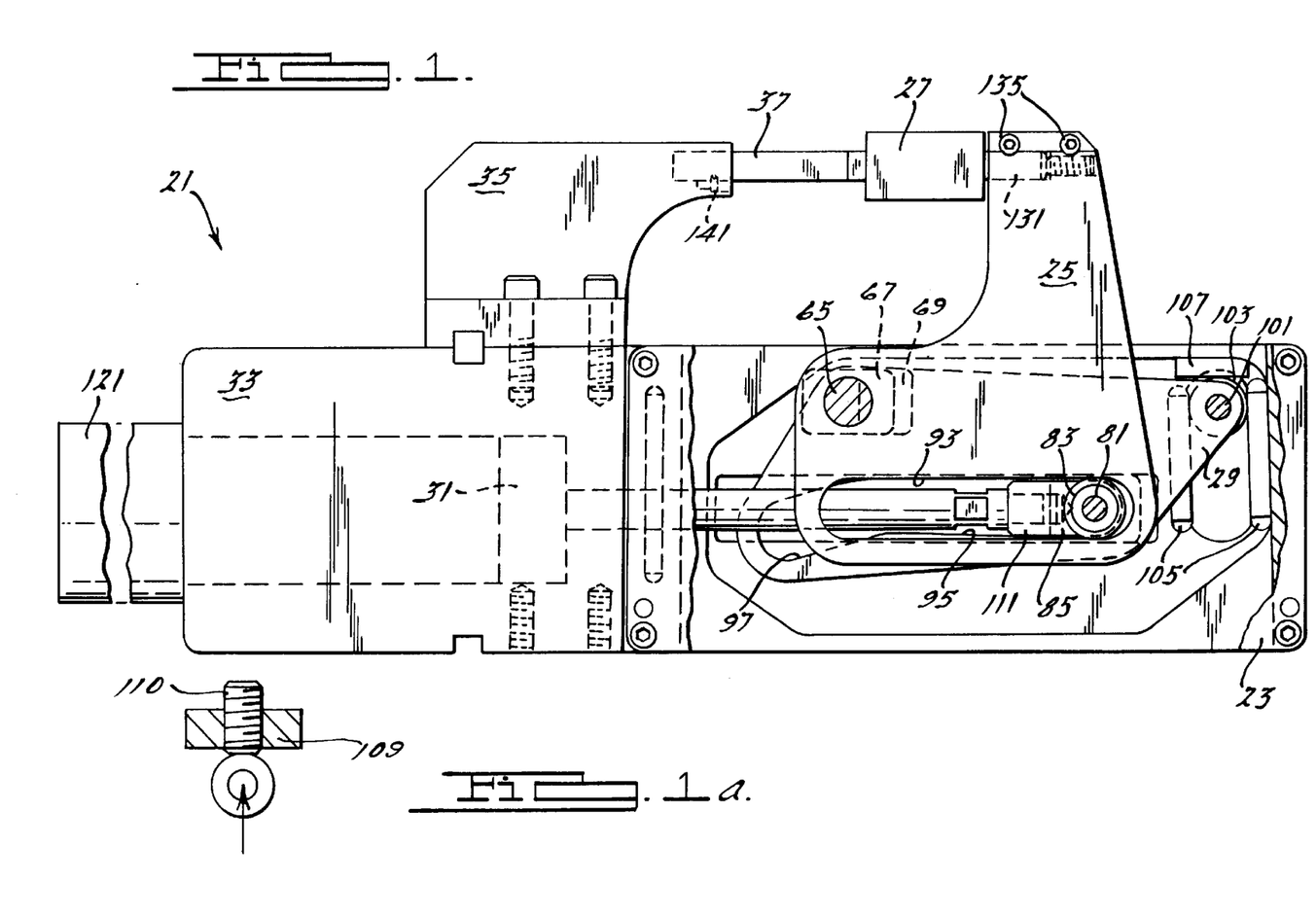
FIG. 1 is a side elevational view showing the preferred embodiment of a force multiplying apparatus of the present invention, disposed in a fully closed or material engaging position.
FIG. 1a is a diagrammatic side elevation view showing an alternate embodiment stop employed in the force multiplying apparatus of the present invention.

Referring to FIGS. 1 and 2, the preferred embodiment of a force multiplying apparatus 21 of the present invention is shown in a fully closed or material engaging position. Apparatus 21 is preferably a five ton clinch-type clamp. Apparatus 21 includes a body 23, a pair of swing arms 25, a punch 27, a pair of cam drive links 29, a piston 31, a piston cylinder 33, a die support 35 and a die 37. Body 23 is a stationary member consisting of a casing 51 and a cover 53.

Figure 5:
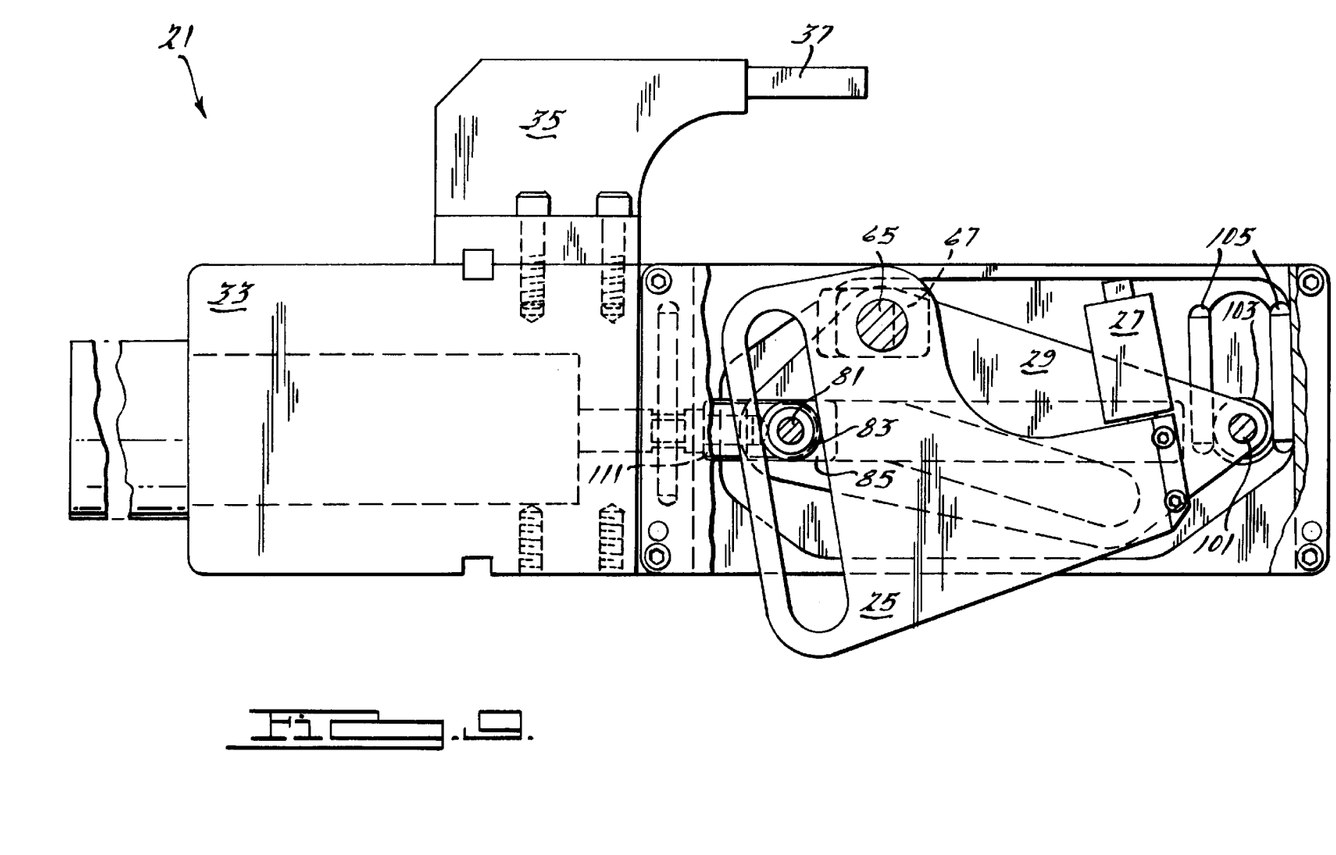
FIG. 5 is a side elevational view showing a pivot slide block employed in the preferred embodiment apparatus of the present invention.

As can best be observed in FIGS. 1–3, swing arms 25 have substantially L-shaped, symmetrical configurations such that only one will be described in detail hereinafter. Swing arm 25 has an elongated linear arm slot 61 and a pivot hole 63. A cylindrical center portion of a pivot pin 65 projects through pivot hole 63. Referring to FIGS. 1, 2 and 5, D-shaped ends of pivot pin 65 are secured within substantially rectangular pivot slide blocks 67. Pivot slide blocks 67 are capable of longitudinal linear movement within a longitudinally oversized receptacle 69 of body 23.

Returning to FIGS. 1–3, a cylindrical central portion of a cam slide pin 81 has four, heavy load, sealed roller bearing races 83 located therearound. The inner two of these bearing races 83 are slidably engagable within slot 61 of arm 25. As can be observed in FIGS. 1, 2 and 6, D-shaped ends of cam slide pin 81 are secured within cam slide blocks 85. These cam slide blocks 85 are linearly slidable along an elongated longitudinally oriented channel 87 within body 23.

Referring to FIGS. 1, 2 and 4, each symmetrical cam drive link 29 includes a pivot aperture 91 for engagement about pivot pin 65. Cam drive link 29 further includes a camming slot 93 having a longitudinally oriented linear portion 95 joined to an angled portion 97. The outer two bearing races 83 movably engage within camming slot 93 of cam drive link 29. A secondary aperture 99 is provided within a corner of cam drive link 29 for engagement with a cam drive pin 101. A pair of heavy load, sealed roller bearing races 103 are shown engaged upon ends of cam drive pin 101 within FIGS. 1, 2 and 8. Bearing races 103 are linearly movable along a transverse direction (perpendicular to movement of a piston rod 113) within a track defined by a pair of parallel, hardened cam plate fingers 105 disposed along each interior surface of body 23. A vertical stop block 107 transversely projects from body 23 and acts to vertically limit cam drive link 29. An alternate embodiment of a vertical stop block 109 and threaded set screw 110 are shown in FIG. 1a. Screw 110 is adjustable. A lower end of screw 110 abuts against bearing races 103.

Referring now to FIGS. 1, 2 and 7, a rod eye 111 has a passageway surrounding the center of cam slide pin 81. Rod eye 111 is threadably engaged upon a distal end of piston rod 113 projecting from piston 31. Piston 31, piston rod 113 and rod eye 111 act as driving members for actuating the swing arm 25. Piston cylinder 33 is of a pneumatically driven variety having an 82.5 millimeter diameter bore and a 180 millimeter stroke. An end cap 121 is also provided. End cap 121 has internal, weld field immune, AC/DC switches and one rear mounted five pin micro connector. Body 23 additionally has a thrust key 123.

Figure 13:
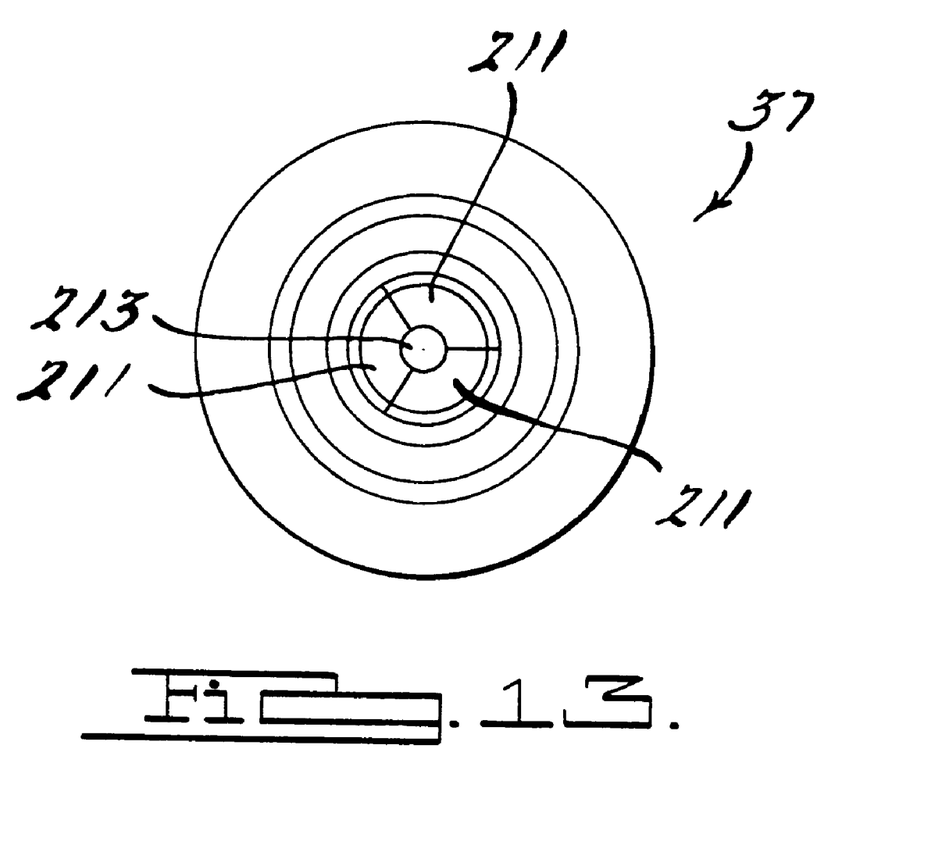
FIG. 13 is a true elevational view showing a die employed in the preferred embodiment apparatus of the present invention.

As is best illustrated in FIG. 1, punch 27 has a threaded mandrel or adjustment screw 131 projecting in alignment therewith. Bore sections 133 of arms 25 securely capture adjustment screw 131 of die 37 therebetween when a pair of locking screws 135, enmeshably spanning between the pair of arms 25, are tightened. Die 37 is coaxially aligned with punch 27 when punch 27 is disposed in the fully closed position. Die 37 is retained to die support 35 by a head of a screw 141 engaging an angled undercut in a side thereof. Punch 27 and die 37 are of the type disclosed within U.S. Patents 5,267,383 entitled "Apparatus for Joining Sheet Material" and 4,459,735 entitled "Joining Sheet Metal", both of which were invented by the inventor of the present invention and are incorporated by reference herewithin. Die 37 further has a movable set of die blades 211 surrounding a central anvil 213, as is shown in FIG. 13. Accordingly, the sheets of material are joined in the lanced or mushroom-shaped and leakproof manners shown therein. Of course, other material forming members may be attached to the swing arms or support. Furthermore, it is envisioned that the die may be affixed to a separate stationary or movable structure. In an alternate embodiment of the present invention, a material gripping jaw may be fastened to the swing arm and support instead of the aforementioned punch and anvil.

The operation of the present invention apparatus 21 can be observed by reference to FIGS. 1 and 9–12. FIG. 9 shows swing arm 25 in a fully open and retracted position. As swing arm 25 moves from the positions of FIG. 9 to that of FIG. 10, cylinder 33 and the piston act to push rod eye 111, cam slide pin 81 and bearing races 83 upward along angled portion 97 of camming slot 93 of cam drive link 29 concurrently with sliding along arm slot 61 of swing arm 25. This acts to move bearing race 103 and cam drive pin 101 in a linear manner along the transverse direction thereby pivoting cam drive link 29. This slight linear piston movement further causes swing arm 25 to significantly pivot away from the open position.

Figure 10:
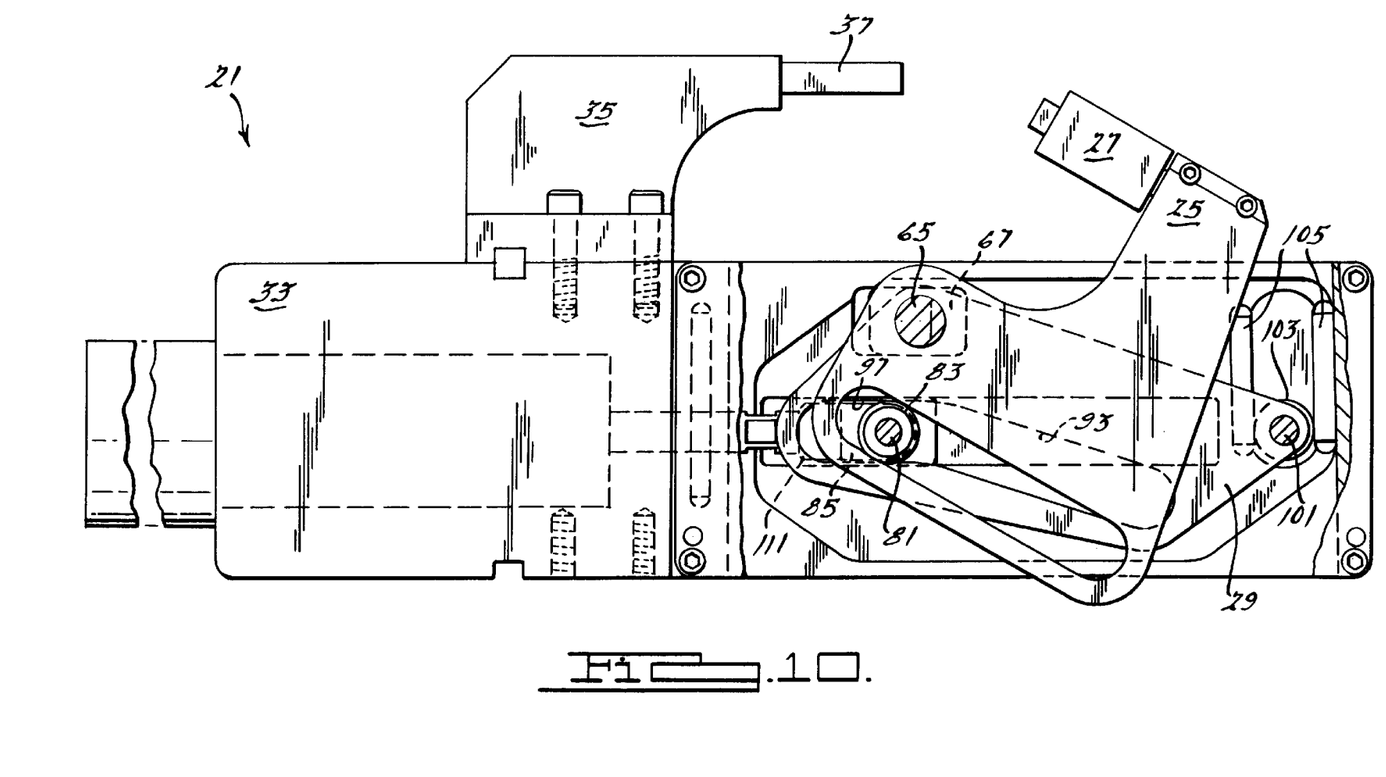
Figure 11:
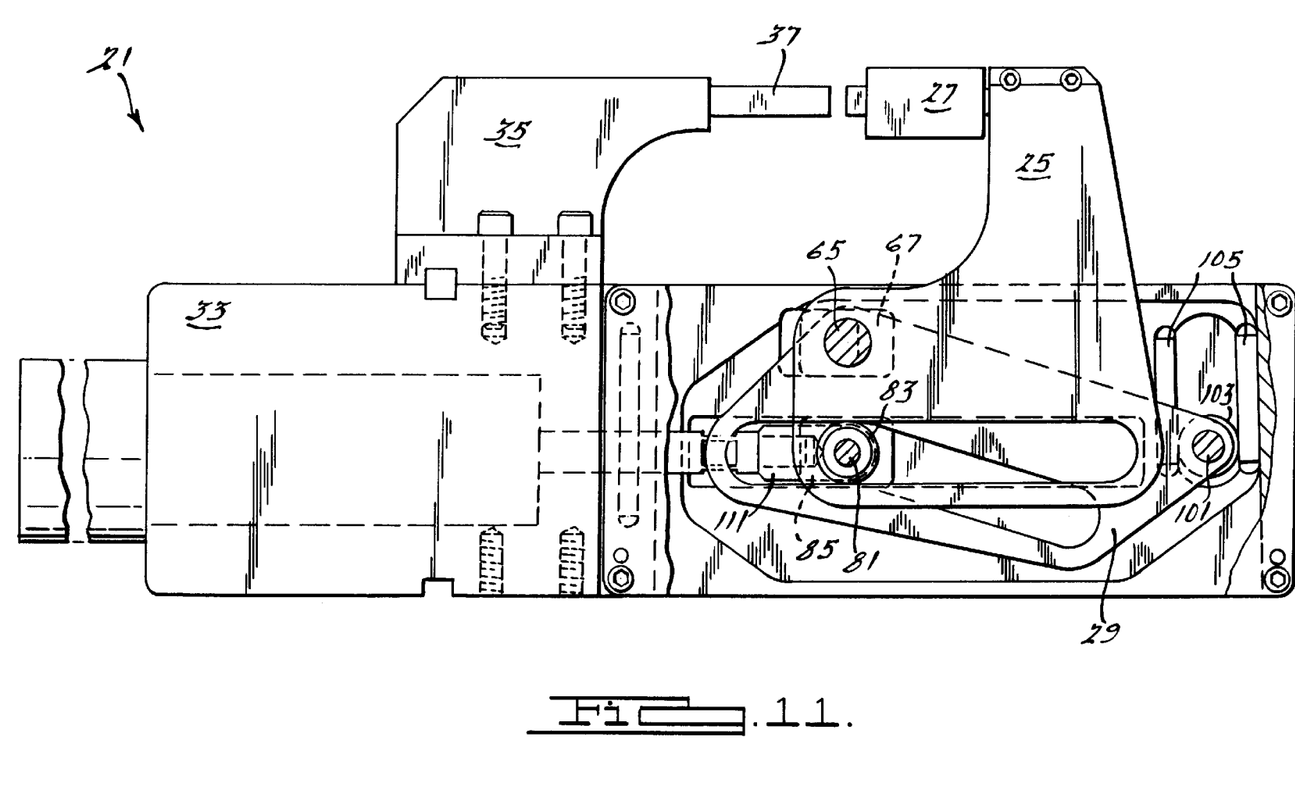
Figure 12:
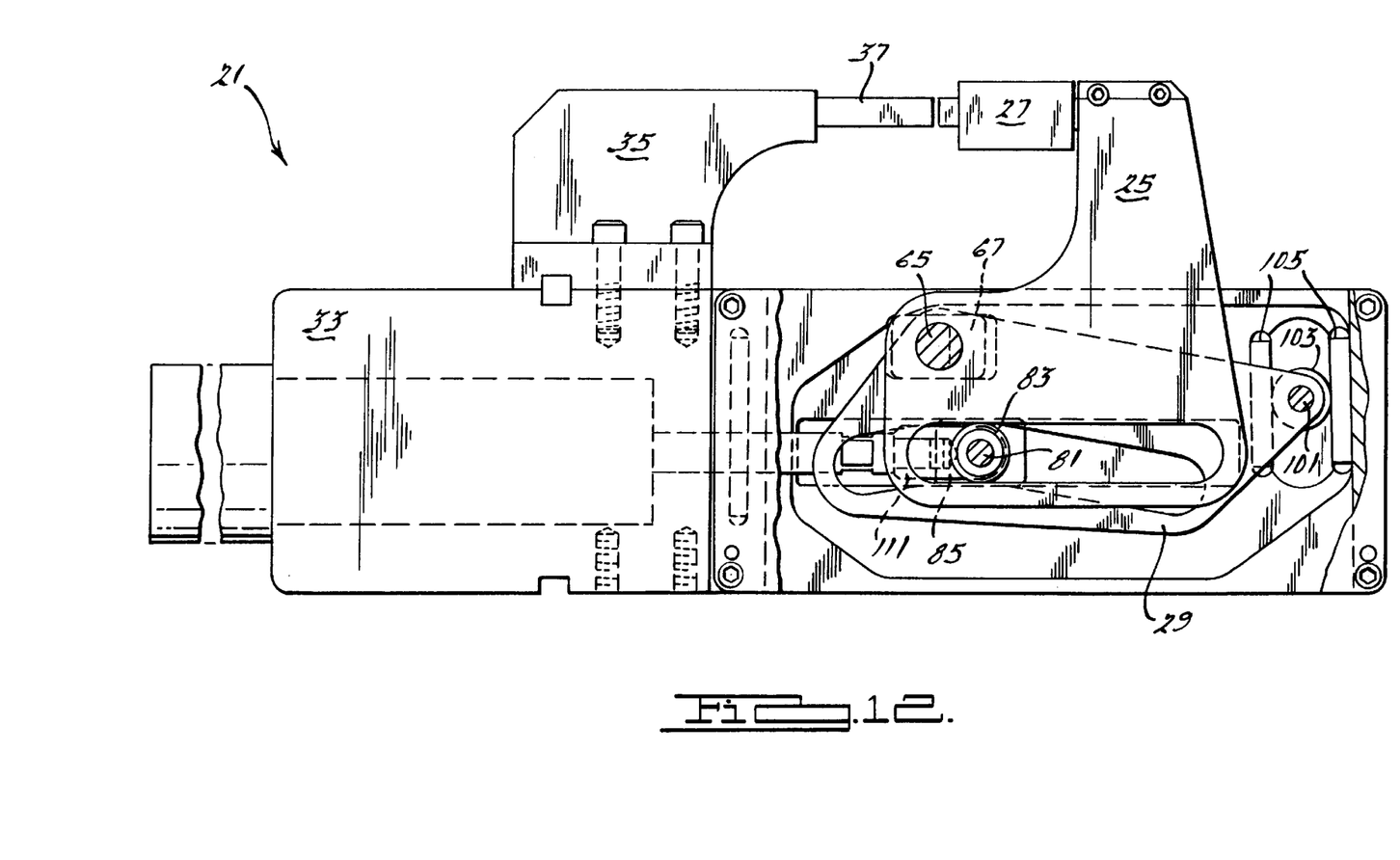

As rod eye 111, cam slide pin 81 and bearing races 83 are subsequently moved between the positions of FIGS. 10–11, bearing races 83 further slide along angled portion 97 of camming slot 93 while also riding along arm slot 61. Thus, swing arm 25 has been rotated 80° between the fully opened position of FIG. 9 and an extended, end of rotation position as shown in FIG. 11. Next, referring to the movement between FIGS. 11, 12 and 1, continued movement of rod eye 111, cam slide pin 81 and bearing races 83 cause swing arm 25, and punch 27 mounted upon a distal section thereof, to linearly move approximately ten millimeters in a linear manner opposite that of piston 31 and rod eye 111. As part of this motion, pivot pin 65 and pivot slide block 67 are linearly moved in conjunction with swing arm 25. Bearing race 103, and the adjacent portion of cam drive link 29, concurrently move transversely along track fingers 105. The interaction of track fingers 105 and bearing race 103 limits and forces cam drive link 29 and arm 25 to move linearly, while cam drive link 29 is also pivoting, in response to movement of piston 31 and rod eye 111. Thus, swing arm 25 is first moved in a pivoting manner and subsequently moved in strictly a linear manner thereby multiplying the driving force to create a significantly enhanced clinching and clamping force. The pneumatic cylinder and piston generate approximately 80 psi while the resultant clamping force is approximately 249,000 pounds.

While the preferred embodiment of this apparatus has been disclosed, it will be appreciated that various modifications may be made without departing from the present invention. For example, the rod eye may be driven by hydraulic or electric means. Furthermore, a variety of arcuate shaped slots may alternately be provided. The slots may alternately take the form of channels or separate linkages and pins as long as the disclosed motion is achieved. It is intended by the following claims to cover these and any other departures from the disclosed embodiments which fall within the true spirit of this invention.

The invention claimed is:

1. An apparatus for clamping a workpiece, said apparatus comprising:

an arm having an elongated arm slot, said arm being movable from a retracted position to a workpiece engaging position;

a drive link having an elongated camming slot;

a cam slide member movably coupling said arm slot to said camming slot, operable movement of said cam slide member along said slots causing said arm to initially move in a pivoting manner and then subsequently move in a first linear direction without pivoting when moving said arm from said retracted position to said workpiece engaging position;

an automatically powered piston operable to drive said arm and said piston advancing in a second linear direction substantially opposite said first linear direction, said pivoting and linear arm movement multiplying the driving force of said piston;

a stationary body, said drive link and said arm being pivotably coupled internal to said body, said piston being movable relative to said body;

a pivot slide block linearly movable in the direction of travel of said piston and being coupled to said drive link, said pivot slide block acting as a common pivot for said drive link and said arm;

a track fixed to said body and being linearly oriented in a third direction substantially perpendicular to said first direction; and a bearing coupled to said drive link for engaging said track thereby operably causing an adjacent portion of said drive link to linearly move in said third direction and causing a second portion of said drive link to linearly move in said first direction.

2. The apparatus of claim 1 wherein air pressure is applied to move said piston.

3. The apparatus of claim 1 wherein said arm has an L-shape.

4. An apparatus for clamping a workpiece, said apparatus comprising;

an arm initially movable in a pivoting manner and then subsequently movable in a first linear and nonpivoting direction in a single continuous motion as said arm is operably moved from a retracted position to a workpiece engaging position, said arm having an elongated arm slot;

an automatically powered piston operably driving said arm, said piston operably advancing in a second linear direction substantially opposite said first linear direction, said piston only being movable in said linear directions, said continuous pivoting and linear arm movement multiplying the driving force of said piston;

a stationary body, said piston being movably located in said body;

a punch mounted to one of said arm and said body;

a die fixedly mounted to the other of said arm and said body;

a pivot slide block linearly movable in said second direction, said pivot slide block acting as a common pivot for said drive link and said arm;

a cam slide member movably coupling said arm slot to said camming slot, operable movement of said cam slide member along said slots causing said arm to first move in said pivoting manner and then subsequently move in said first linear direction when moving said arm from said retracted position to said workpiece engaging position;

a drive link having an elongated camming slot with a straight section and an offset angled section, said offset angled section behind located closer to said piston than said straight section, said drive link and said arm being pivotably coupled to said body;

a track fixed to said body and linearly extending in a third direction; and a bearing coupled to said drive link for engaging with said track thereby operably causing an adjacent portion of said drive link to linearly move in said third direction and causing a second portion of said drive link to linearly move in said second direction substantially perpendicular to said third direction.

5. The apparatus of claim 4 wherein said arm has an L-shaped configuration and an arm slot has an elongated, substantially linear shape.

6. The apparatus of claim 4 further comprising:

an outer body having a piston chamber;

a section of said arm having an elongated slot located internal to said body; and a member advancing with said piston engaging said slot of said arm, said member being entirely located inside of said body.

7. The apparatus of claim 4 wherein said punch operably moves with said arm for engaging said workpiece which contacts against said die.

8. The apparatus of claim 4 wherein said die includes an anvil, said arm operably moves said punch toward said anvil solely in said first linear direction for creating a joint in said workpiece, said workpiece includes multiple sheets of material.

9. The apparatus of claim 8 wherein said die further includes a movable set of die blades which are operable with said punch to form and then expand a displaced portion of said sheets of material whereby said sheets of material are securely joined together.

10. An apparatus for joining sheets of material, said apparatus comprising:

an enclosed body;

an arm pivotably coupled to and partially located in said body;

a punch mounted on said arm, said arm initially being movable in a pivoting manner and then subsequently being movable in a linear and nonpivoting manner as said arm is operably moved from an open position to a material sheet engaging position, said pivoting and linear movement increasing the sheet joining force;

a die having a movable set of die blades which are operable with said punch to form and then expand a displaced portion of said sheets of material whereby said sheets of material are securely joined together, said die being statutorily mounted relative to said body;

a drive link pivotably coupled to said body;

a pivot linearly movable in a first direction, said pivot acting as a common pivot point for said drive link and said arm;

a cam slide member movably coupling said arm to said drive link, said cam slide member being entirely located internally in said body, operable movement of said cam slide member causing said arm to first move in said pivoting manner and then subsequently move in said linear manner when moving said arm from said open position to said material sheet engaging position;

a track coupled to said body and linearly extending in a second direction; and a bearing coupled to said drive link and engaging said track thereby operably causing an adjacent portion of said drive link to linearly move along said second direction and causing a second portion of said drive link to linearly move along said first direction substantially perpendicular to said second direction.

11. The apparatus of claim 10 wherein said arm has an L-shape.

12. The apparatus of claim 10 further comprising a fluid powered piston operably driving said arm, said piston being linearly driven toward said arm when at least a portion of said arm linearly moves in an opposite direction.

13. The apparatus of claim 12 wherein said fluid is air.

* * * * *

UNITED STATES PATENT AND TRADEMARK OFFICE
CERTIFICATE OF CORRECTION

Page 1 of 2

PATENT NO. : 6,115,898
DATED : September 12, 2000
INVENTOR(S) : Edwin G. Sawdon

It is certified that error appears in the above-identified patent and that said Letters Patent is hereby corrected as shown below:

On the Title Page Under U.S. Patent Documents, reference 3,482,830, "Sendaykas" should be -- Sendoykas --.

On page 2 of the Title Page Under U.S. Patent Documents, Column 1, insert -- 4,905,973 3/1990 Blatt --.

On the Title Page Under Other Publications, insert
-- BTM Corporation a New Breed of Power, published prior to June 6, 1994, entire book --
-- BTM Corporation a New Breed of Power, published in 1982, entire book --
-- DE-STA-CO, Durchsetzfuge-Technik, 1993, 4 pages --.

Column 1, line 37, "Blaft" should be -- Blatt --.

Column 2, line 28, delete "3".

UNITED STATES PATENT AND TRADEMARK OFFICE
CERTIFICATE OF CORRECTION

PATENT NO. : 6,115,898
DATED : September 12, 2000
INVENTOR(S) : Edwin G. Sawdon

It is certified that error appears in the above-identified patent and that said Letters Patent is hereby corrected as shown below:

Column 5, line 43, "behind" should be -- being --.

Column 6, line 7, "4" should be -- 7 --.

Column 6, line 32, "statutorily" should be -- stationarily --.

Signed and Sealed this

Eighth Day of May, 2001

Attest:

NICHOLAS P. GODICI

Attesting Officer

Acting Director of the United States Patent and Trademark Office